T. C. W. PULLINGER.
SECURING OF INTERNAL COMBUSTION ENGINE SPARKING PLUGS.
APPLICATION FILED DEC. 26, 1916.

1,278,011.

Patented Sept. 3, 1918.

Witnesses
Frank Roth
J. B. Fleming

Inventor
T. C. W. Pullinger
by Bakewell, Byrnes & Parmelee
Attys

UNITED STATES PATENT OFFICE.

THOMAS CHARLES WILLIS PULLINGER, OF THE BRAE, NEAR DUMFRIES, SCOTLAND, ASSIGNOR OF ONE-HALF TO WILLIAM BEARDMORE, OF GLASGOW, SCOTLAND.

SECURING OF INTERNAL-COMBUSTION-ENGINE SPARKING PLUGS.

1,278,011.  Specification of Letters Patent.  Patented Sept. 3, 1918.

Application filed December 26, 1916. Serial No. 138,734.

*To all whom it may concern:*

Be it known that I, THOMAS CHARLES WILLIS PULLINGER, a subject of the King of England, residing at The Brae, near Dumfries, Scotland, Great Britain, have invented certain new and useful Improvements in the Securing of Internal-Combustion-Engine Sparking Plugs, of which the following is a specification.

This invention is for improvements in or relating to the securing of internal-combustion engine sparking-plugs. As is well-known sparking-plugs are commonly screwed into a bush which is secured in the engine-cylinder, and various means have been adopted for securing these bushes.

According to the present invention, the bush which is internally screw-threaded to receive the sparking-plug is flanged at the cylinder-end to engage a seating provided for it in the wall of the cylinder and is secured in position by a lock-nut screwed on an exterior thread at the end of the bush outside the cylinder.

If desired, the bush may be provided with a packing of metal between it and the surrounding cylinder-wall, which packing is so arranged that when the fastening-nut for the bush is screwed home, the packing is wedged into position so as to secure good metallic contact between the outer wall of the bush and the cylinder-wall, whereby the heat may be readily conducted from the bush to the cylinder-wall.

In the accompanying drawings:—

Figure 1:
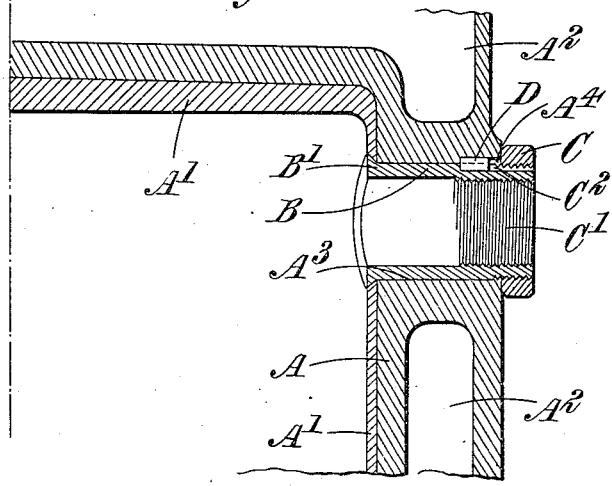
Figure 2:
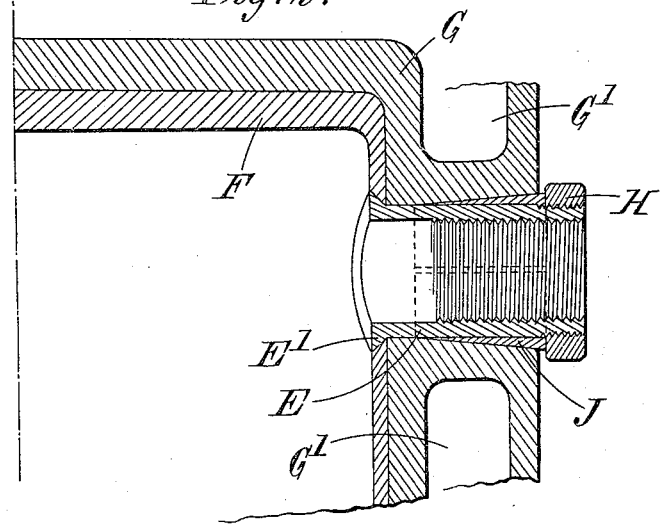

Figure 1 is a section through part of a cylinder of an engine and a bush secured therein according to one method of carrying out this invention, and Fig. 2 is a similar section through similar parts showing another method of carrying out the invention.

The cylinder-wall A of Fig. 1 is shown as lined internally with a steel liner $A^1$ because the cylinder-wall itself is intended to be composed of a light material such as aluminium, and water-spaces $A^2$ are formed within the wall.

At a point in the wall where a solid part extends across the water-space, a passage $A^3$ is provided to receive a bush B for the sparking-plug. This bush is pushed into place from the inside of the cylinder and it has at its inner end a lateral outwardly-projecting flange $B^1$ which is provided with a conical face on that side toward the liner. The liner is correspondingly recessed so that the flange fits close in the recess and the bush is pulled tight into place by a nut C which is screwed on to the outer end of the bush and butts against the wall of the cylinder. When the bush is in place, the inner end of it is faced off flush with the face of the liner $A^1$.

The interior of the bush is screw-threaded at $C^1$ to receive the sparking-plug in the usual manner.

To prevent angular movement of the bush, a key D may be provided. This key is accommodated by a channel $C^2$ in the wall of the bush and a corresponding channel $A^4$ in the wall of the cylinder. Once the key is inserted in place, it is prevented from coming out by the nut C which is large enough to close the outer ends of the channels $C^2$ and $A^4$.

In Fig. 2, a bush E is shown having a flanged inner end $E^1$, which bears against a liner F in the interior of the cylinder-wall G, as before, but the fastening-nut H does not bear against the outer side of the cylinder wall. A conical metal packing-sleeve J is inserted between the outer wall of the bush and that part of the wall of the cylinder which receives it, and the nut H bears against the outer end of this sleeve. It thus follows that as the nut is screwed home, the sleeve J is wedged tightly in place and insures close metallic contact between the wall of the cylinder and the bush.

The object of providing for this close metallic contact is to insure that the heat shall be conducted away from the bush to the wall of the cylinder and thence to the cooling medium with which the hollow interior $G^1$ is provided in the usual manner. The orifice in the wall of the cylinder which receives the bush is made conical at that part which is to accommodate the sleeve J.

This sleeve in addition to serving as a heat-conductor, effectually binds the bush in place, so that a key such as is shown at D, Fig. 1, is not required. It will be observed that the sleeve does not extend along the whole length of the bush, the inner end of which is accommodated in a parallel portion of the orifice in the cylinder-wall.

The bush E is faced off on the inner end flush with the liner after fixing, as described with reference to the bush B.

What I claim as my invention and desire to secure by Letters Patent is:—

1. A removable device for securing spark plugs in an internal combustion engine cylinder, comprising a bushing having a flange seated in a seat in the wall of the cylinder, said bushing extending through an opening in the cylinder, the protruding end of the bushing having external threads thereon, a nut on said threads for securing the bushing in position in the seat in the cylinder, means for locking the bushing against rotary movement in the opening in the cylinder, said means being held against endwise movement by the nut, and securing threads on the interior of the bushing for receiving the threaded end of a spark plug.

2. A device of the character described, comprising a bushing extending through an opening in the wall of an engine cylinder, said bushing having a flange at one end within the cylinder seated in a recess shaped to accommodate it in the wall of the cylinder, a nut on the other end of the bushing, a tapered sleeve surrounding the bushing and engaging the wall of the orifice through the cylinder and extending beyond the wall of the cylinder, the end of said sleeve being arranged to be engaged by the nut to force it into position between the bushing and the wall of the opening.

3. A device of the character described, comprising an internal combustion cylinder having an opening therethrough, a flanged bushing extending through said opening, said flange being seated in a recess shaped to conform thereto in the inner face of the wall of the cylinder, a metallic packing ring engaging the outer face of the bushing and a portion of the wall of the opening through the cylinder, and a securing nut engaging the bushing and the end of the packing ring for drawing the bushing to its seat in the opening and for forcing the packing ring into the position around the bushing.

In testimony whereof I have signed my name to this specification in the presence of two subscribing witnesses.

THOMAS CHARLES WILLIS PULLINGER.

Witnesses:
R. T. NICOL,
WILLIAM LOWE.